United States Patent [19]

Knizia

[11] Patent Number: 4,720,968
[45] Date of Patent: Jan. 26, 1988

[54] METHOD AND APPARATUS FOR DRIVING AN ELECTRICAL POWER PLANT

[76] Inventor: E. H. Klaus Knizia, Blumenweg 17, 5804 Herdecke, Fed. Rep. of Germany

[21] Appl. No.: 823,620

[22] Filed: Jan. 29, 1986

[30] Foreign Application Priority Data

Feb. 2, 1985 [DE] Fed. Rep. of Germany ....... 3503611

[51] Int. Cl.$^4$ .............................. F02C 6/18; F02C 7/10
[52] U.S. Cl. .................................. 60/39.02; 60/39.182; 60/39.511
[58] Field of Search ............... 60/39.02, 39.12, 39.181, 60/39.182, 39.465, 39.511

[56] References Cited

U.S. PATENT DOCUMENTS

| | | | |
|---|---|---|---|
| 2,653,447 | 9/1953 | Heller | 60/39.182 |
| 2,787,121 | 4/1957 | Bouffart | 60/39.465 |
| 3,164,958 | 1/1965 | Paucault | 60/39.182 |
| 3,385,565 | 8/1967 | Aguet | 60/39.182 |
| 3,735,588 | 5/1973 | Moskowitz et al. | 60/39.511 |

FOREIGN PATENT DOCUMENTS 322503 11/1972 U.S.S.R. .

Primary Examiner—Louis J. Casaregola
Attorney, Agent, or Firm—Toren, McGeady & Associates

[57] ABSTRACT

In a method and apparatus for driving an electrical power plant by the combined operation of a gas turbine 8 and a steam turbine 11, combustion air fed to the gas turbine 8 is cooled in a cooler 2 after passing through a first stage compressor 1 by means of condensate supplied to the cooler 2 from a condenser 17 of the turbine 11 by a pump 18. After passing through a second stage compressor 3, the combustion air is preheated in a heat exchanger 4 by a steam lead from the steam turbine 11 and is then further heated to a much higher temperature in a heat exchanger 5 by means of a heat carrying liquid, for example liquid sodium, which is itself heated in heat exchangers 10 and 35 by flue gas from a steam generator 9, which supplies steam to the steam turbine 11 and by flue gas from the gas turbine 8. The liquid sodium has a low pressure at very high temperatures and accordingly enables heat to be transferred at high temperatures, for example temperatures of more than 800° C.

6 Claims, 2 Drawing Figures

METHOD AND APPARATUS FOR DRIVING AN ELECTRICAL POWER PLANT

This invention relates to a method of driving an electrical power plant by the combined operation of a gas turbine and a steam turbine, in which air which is fed to the gas turbine is heated by heat from steam power plant. It also relates to apparatus for carrying out the metod.

Natural gas which has been economically available for a number of years has favoured, due to its combustion properties, the development of so-called combined power units, in which a Joule cycle is coupled with a Clausius-Rankine cycle. This combination is carried out by connecting a natural gas-fired gas turbine with a steam power plant. The exhaust gas from the gas turbine is supplied to the steam generator of the steam power plant and produces there, from the waste heat of the gas turbine operation without additional combustion in the steam generator, the steam for the associated steam power plant. In this way the thermodynamic advantages of the two plants can be used and their disadvantages avoided. As a consequence, thermal efficiency levels are obtained which are higher than those of uncombined Joule or Clausius-Rankine cycle plants operated under the same state conditions. The energy required for the two cycles is produced exclusively by the combustion of natural gas in the combustion chamber of the gas turbine, while the steam generator of the steam power process is constructed as a waste-heat boiler.

The maximum temperatures occurring in the combustion chamber of the gas turbine with stoichiometric combustion of the gas exceed the gas turbine inlet temperatures which at present can be technically accepted. A reduction in the combustion temperature of the gas-air mixture, either by cooling the combustion chamber walls with simultaneous production of steam or by increasing the air excess in the combustion chamber, is therefore essential.

If this lowering of the combustion temperature in the combustion chamber of the gas turbine is produced by providing an excess of air, the exhaust gas from the gas turbine contains uncombined oxygen; this allows further fuel to be burnt in the steam generator which is connected to the gas turbine.

With this additional combustion, the flue gas temperature occurring in the furnace of the steam generator or steam power plant can be raised above the temperature of the exhaust gas from the gas turbine, which in turn makes possible higher temperature steam conditions for the steam circuit and thus a higher efficiency of the following steam power cycle.

With an increase of the maximum admissible gas turbine inlet temperature, however, the quantity of excess air required for reducing the combustion temperature decreases and thus also the oxygen content in the exhaust gas from the gas turbine decreases because the combustion in the combustion chamber of the gas turbine approaches the stoichiometric values. To the same extent, however, the possibility of using additional fuel with the exhaust gas of the gas turbine in the following steam generator in order to enable the flue gas temperature to be raised above the temperature of the turbine exhaust gas, decreases.

The recently rising cost of natural gas is the cause of a development, which tends to direct electricity generation in thermal power plants, apart from nuclear energy, back again to coal as a primary energy source, the objective being to achieve the advantages of the combined units heated by gas also in coal-fired power plants in a form of construction combining gas turbine and steam turbine cycles.

The object of the present invention is to provide a method and an apparatus for driving an electrical power plant as initially described wherein a higher proportion of the required energy may be obtained by direct combustion of coal and simultaneously an increase in thermal efficiency of the combined cycle of operation is achieved.

To this end, according to one aspect of this invention, a method as initially described is characterised in that air which is fed to the gas turbine and/or air which is fed to the furnace of the steam power plant, and/or fuel gas which is fed to the gas turbine is heated by a heat carrier which is liquid at low pressures and high temperatures and is heated in a heat exchanger which is in contact with hot flue gas from the steam power plant or from the gas turbine, and/or by steam from the steam power plant.

The invention is based on the concept of removing heat from the gas turbine cycle and the steam turbine cycle and supplying it to the other cycle in each case at a point where the heat, due to its temperature level, leads to an improvement in the total plant efficiency and a reduction in the gas consumption of the gas turbine plant.

Optionally, fuel gas fed to the gas turbine is also heated by the heat carrier liquid, or by steam from the steam power plant.

The air which is fed to the gas turbine and/or the furnace may also be heated by the heat carrier liquid with the heat exchanger in contact with the hot flue gas from the gas turbine.

By the use of a heat carrier which is liquid at high temperatures and low pressures, heat at a high temperature can be removed from the flue gas of the steam power plant. This heat serves for preheating the air necessary for operating the gas turbine and/or fuel gas for the gas turbine to a high temperature. The quantity of heat required for this purpose consequently does not have to be supplied in the circuit of the gas turbine, i.e. in the combustion chamber by the combustion of gas, but may be obtained by the combustion of coal in the furnace of the steam power plant.

The same is true if steam from the steam power plant is used for removing heat from the steam power plant into the gas turbine circuit. In this case, the temperatures are lower, so that the steam which forms a heat carrier is preferably used in a first stage of a multi-stage preheating of the air and the fuel gas, while in a second stage of the preheating the heat carrier which is liquid at low pressures and high temperatures is used. The quantity of heat removed by means of the steam and the liquid heat carrier from the flue gases of the steam power plant can become so large that an additional heat supply from the combustion of fuel gas in the combustion chamber of the gas turbine is no longer necessary and the gas turbine operates just as a hot air turbine.

It is also possible to operate the combined plant only with heat removal from the flue gases of the steam generator.

Preferably, sodium is used as the heat carrier which is liquid at low pressures and high temperatures. Since sodium becomes liquid at approximately 100° C. and does not evaporate under ambient pressure until it reaches a temperature of about 890° C., it is capable of transferring heat within this temperature range in a circuit which is unpressurised apart from friction losses, without any phase change taking place. Furthermore, the saturation temperature of the sodium increases steeply with increasing pressure, so that it can also transfer heat with much higher temperatures at relatively low pressures (e.g. 1000° C. at a saturation pressure of approximately 2.7 bar). The other material properties of sodium, such as its high thermal conductivity, high thermal capacity and low viscosity, make it especially suitable for transferring heat into and out of gas streams, while it is possible to keep the pressure losses of the heat exchange in the gas streams low and to avoid long ducts or pipes for conducting gas at high temperatures. Apart from sodium, examples of suitable liquid heat carriers are potassium, a eutectic alloy of potassium and sodium, mercury and various salts.

Owing to the considerable preheating of the air supplied to the gas turbine and of the fuel gas, the air excess required in the combustion chamber of the gas turbine is increased and thus the oxygen content in the exhaust gas of the gas turbine is increased. Therefore at least part of the oxygen containing exhaust from the gas turbine may be fed to the furnace of the steam power plant.

Since, moreover, the temperature of the gas turbine exhaust gas is not lowered by giving up heat to the combustion air of the gas turbine, a more favourable combustion in the furnace of the steam generator is obtained by the higher temperature and at the same time with a higher oxygen content as a whole.

The very high temperatures after preheating of the combustion air and of the fuel gas for the gas turbine thus lead to a reduction in the quantity of fuel gas required and therefore, if this fuel is obtained by the gasification of coal, they thus lead to a reduced expenditure for the coal gasification plant and to a higher proportion of fuel which is converted in the furnace of the steam generator. The high temperatures lead also, however, for a given inlet temperature into the gas turbine, to a higher air excess at combustion in the combustion chamber of the gas turbine, so that an improvement in the combustion in the steam generator, to which the exhaust gas from the turbine is fed, is obtained.

On account of the use of a heat carrier which is liquid at low pressures and high temperatures, e.g. sodium, the heat exchanger surfaces can be kept small, thus keeping the capital costs low. Furthermore, as heat at high temperature is transported along the considerable distances occurring in a power plant between the steam power plant and gas turbine plant, at low pressure, piping of small cross-section can be used and this can be easily insulated, does not need to have a large wall thickness and its thermal expansion can easily be accommodated.

The sodium heating heat exchanger can be so arranged in the flue gas stream of the steam generator that it is sufficiently protected from adverse effects from the furnace chamber, while the furnace itself is protected by the water-cooled walls of the steam generator.

If, on the other hand, heat were to be transferred from the flue gas of the steam generator by direct heat exchange in a heat exchanger to the combustion air and/or fuel gas of the gas turbine, flue gas at very high temperatures would need to be transported and, on account of its large volume, in large ducts to a air heating heat exchanger located directly upstream of the combustion chamber of the gas turbine. The flue gas would then have to be transported back from this heat exchanger to the flue gas stream of the steam generator. As a result, problems would arise due to thermal expansion in the hot ducts of large cross-section as a consequence of the necessary thermal insulation. In order to overcome the pressure losses in the outward and return transport of the flue gases, the steam generator would need to be operated with excess pressure. The transport of heat by means of flue gas directly into the combustion air would therefore be uneconomical.

The transport of the combustion air for the gas turbine over the distance involved in a combined power plant of present-day size to a heat exchanger in the flue gas stream of the steam generator is still more uneconomical in view of the large volumetric flows, especially on account of the pressure loss that thereby occurs in the combustion air and on account of the large duct cross-sections which are necessary. The duct would, moreover, not only be hot but also be subject to the outlet pressure of the compressor of the gas turbine.

Even if the problem of using such ducts were soluble, it would be quite impossible to accommodate their size, since the ducts of large volume which conduct the exhaust gas from the gas turbine to the furnace of the steam generator, already occupy the space available.

The transfer of large quantities of heat at a high temperature (e.g. above 800° C.) from the flue gas of a steam generator directly to the combustion air of a gas turbine, is consequently technically and economically not possible. Transfer therefore only becomes possible by indirect means by the use of a heat carrier, such as sodium which is liquid at a high temperature (e.g. above 800° C.) and at a low pressure (e.g. at atmospheric pressure or a pressure up to about 3 bar).

In addition, by the use of sodium as a heat carrier, the possibility is obtained of introducing fresh air heated without thermodynamic losses into the furnace of the steam generator. This can be done if a partial stream of the exhaust gas from the gas turbine is used for supplying heat to a circuit in which the sodium circulates. This cooled, partial stream of the exhaust gas from the gas turbine may then be conducted past the furnace of the steam generator to a flue gas purification plant installed upstream of a chimney, while the fresh air heated in the sodium circuit and the non-cooled partial stream of the exhaust gas from the gas turbine are supplied to the furnace of the steam generator. The preheating of the air may be continued up to a very high temperature, without high expenditure for hot ducts being necessary, since the air heater can be arranged in the sodium circuit immediately upstream of the burners of the furnace of the steam generator or steam power plant.

The proposed circuit using, for example, sodium as a heat carrier liquid thus provides the possibility of making heat from the flue gas stream of the steam generator and from the exhaust gas stream of the gas turbine at a high temperature level available at various points of the combined power plant.

Finally, it is also possible to remove heat at relatively low temperature levels from the gas turbine cycle and supply it to the steam power plant, by compressing the air and/or fuel gas for the gas turbine operation in several stages and recooling it at least between two stages by means of condensate from the steam turbine operation. This condensate becomes heated up and returns into the steam turbine circuit, so that a portion of the compressor work which has to be carried out is returned in the form of heat into the steam turbine circuit.

According to another aspect of the invention, apparatus for carrying out the method in accordance with the invention comprises a gas turbine power plant including a compressor, an air heater and a gas turbine, and a steam power plant including a steam generator having a furnace, a steam turbine, and means for supplying oxygen-containing exhaust gas from the gas turbine to the furnace as oxygen for combustion, characterised by at least one air or other gas heater, a heat exchanger exposed to flue gas from the furnace or from the gas turbine, a heat carrier which is liquid at low pressures and high temperatures and means for circulating the heat carrier liquid through the heat exchanger and the air or other gas heater to heat air which is fed to the gas turbine or to the furnace or to heat fuel gas fed to the gas turbine.

Additionally, at least one air heater and/or one gas heater traversed by steam bled from the steam turbine of the steam power plant may be installed in the air supply line or gas supply line leading to the gas turbine so that a two-stage heating of the air supplied to the gas turbine and/or of the fuel gas takes place.

In this way, a portion of the steam which has already performed work in the high-pressure part of the steam turbine serves for preheating the combustion air, with the result that the efficiency of the entire operation is increased in a similar manner to that with regenerative feed-heating in the case of the steam circuit.

In order to keep the work of the compressor of the gas turbine low, it is advantageous to arrange an intermediate cooler between individual compressor stages. This intermediate cooler is, according to a preferred feature of this invention, recooled by condensate from the steam turbine cycle the condensate then being fed as feedwater back into the steam power plant. In this manner, the heat of compression can be at least partly used for preheating the feedwater and thus be recovered.

In certain circumstances, it may be advantageous not to use the exhaust gas of the gas turbine entirely in the furnace of the steam generator, but to divert a portion of the exhaust gas for other purposes, although nevertheless introducing the entire quantity of heat contained in the exhaust gas of the gas turbine into the furnace of the steam generator. This is advantageously achieved with the help of a sodium or other liquid heat carrier heater in the furnace flue gas stream, a sodium or other liquid heat carrier heater in the exhaust gas stream from the gas turbine, and an air heater through which the heated sodium or other liquid flows. The sodium or other liquid heater heated by the exhaust gas from the gas turbine is, for this purpose, located in a partial stream line for the exhaust gas of the gas turbine which is connected to a chimney, while a further partial stream line for uncooled exhaust gas of the gas turbine is connected to the furnace chamber of the steam generator. Furthermore, an air heater which heats additional combustion air and is connected with the furnace chamber of the steam generator via a line, may be disposed in the circuit of the sodium or other heat carrier which is liquid at low pressures and high temperatures.

The sodium or other liquid heater in the exhaust gas stream of the gas turbine and the air heater supplying heated air to the furnace chamber of the steam generator may be arranged either in a closed, separate circuit or in such a way that the sodium heater in the exhaust gas stream of the gas turbine is traversed by a partial stream of the sodium and is connected in series with the sodium heater in the flue gas stream and in such a way that the air heaters or gas heaters are connected in parallel with one another in the sodium circuit.

In contrast to previously proposed thermal power plant operating processes, which for example were to be operated with mercury, or diphenyl or antimony bromide as working medium, in the method and apparatus of this invention the heat exchange liquid, e.g. sodium, is used only as a heat carrier, for transporting heat between the conventional working media of water (steam) and air or other gas.

An example of a method and of an apparatus in accordance with the invention will now be described with reference to the accompanying drawings in which.

Figure 1:
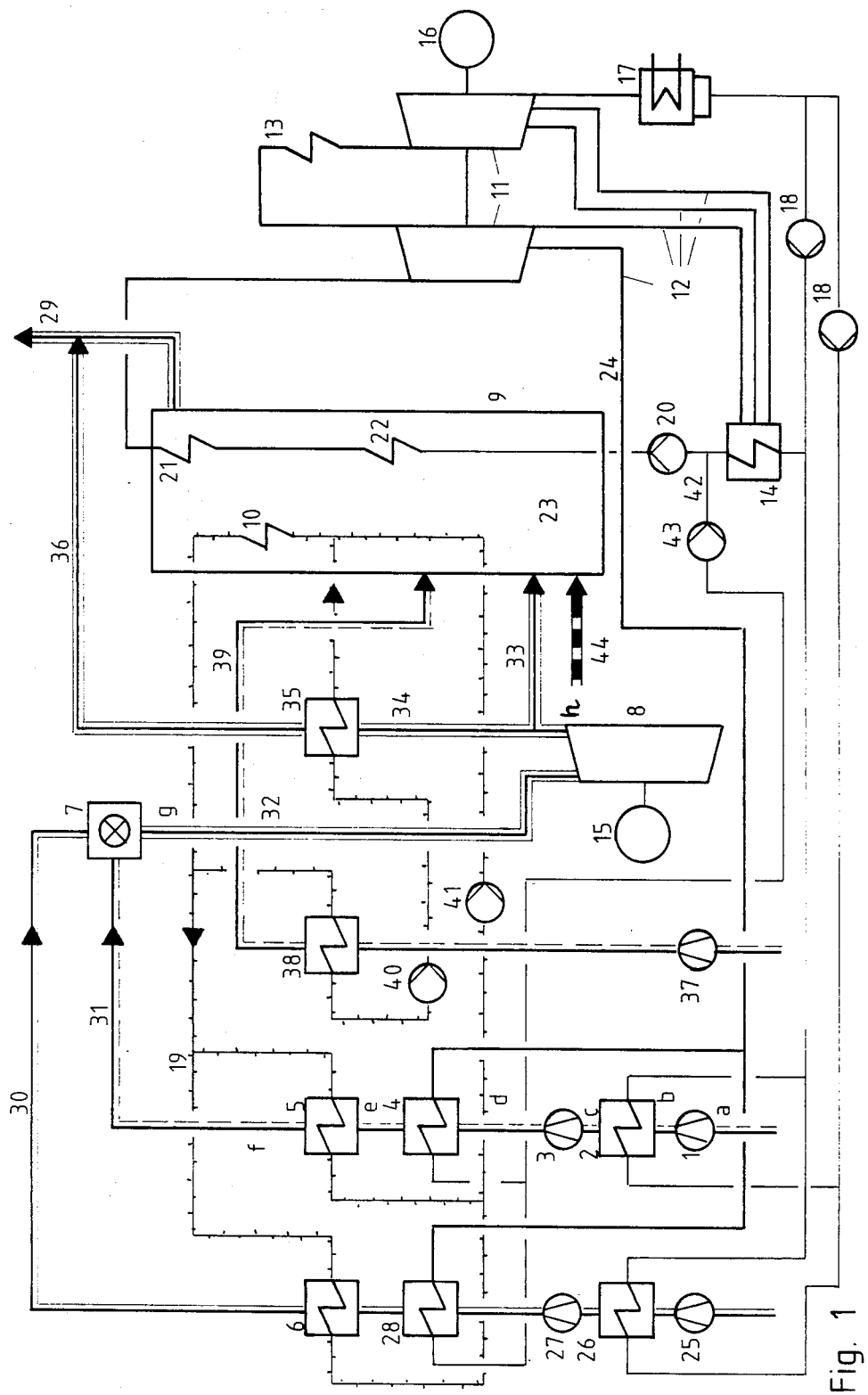
FIG. 1 is a circuit diagram of the apparatus.
Figure 2:
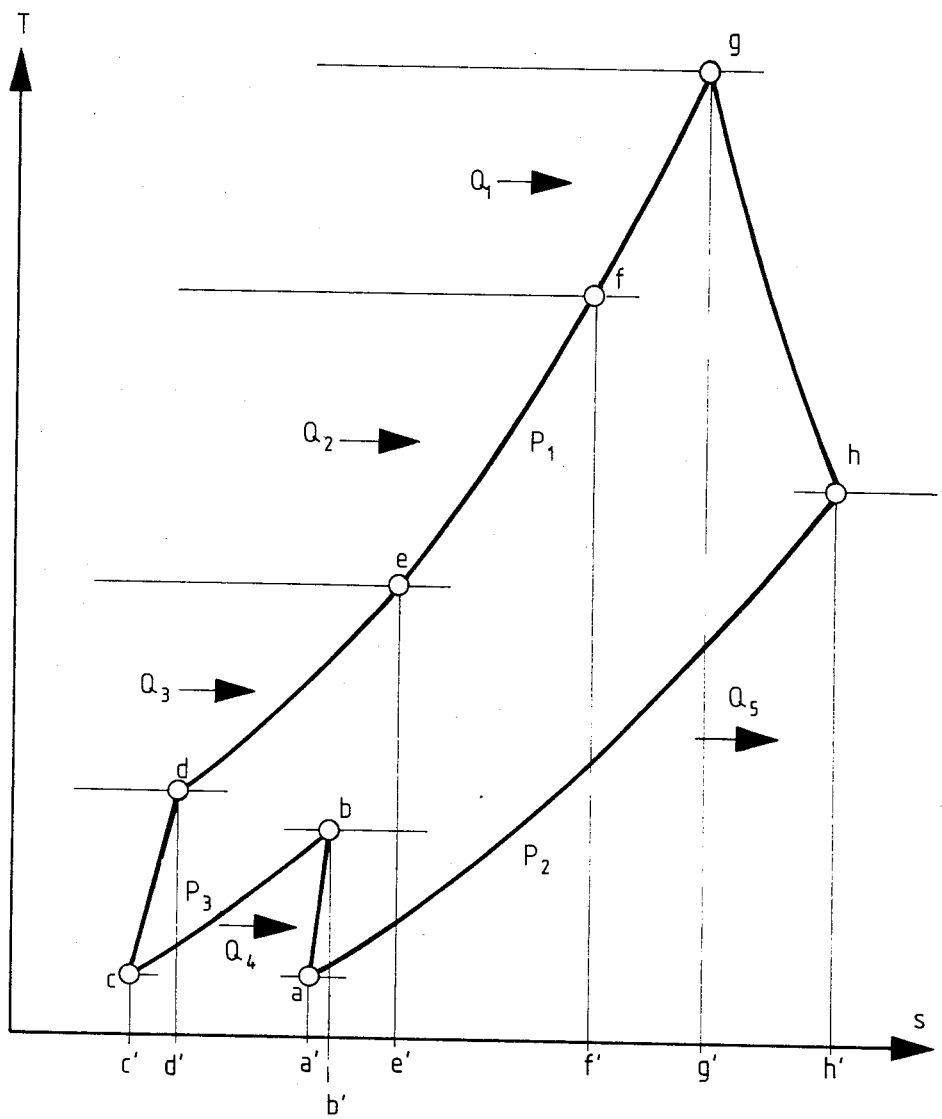
FIG. 2 is a temperature-entropy diagram of the gas turbine cycle.

The combustion air for a gas turbine 8 is sucked in by a compressor 1. The state of the sucked in combustion air is characterised in FIG. 2 by a. In this first compressor stage, the combustion air is compressed to b, and is heated in so doing. The combustion air compressed in the first stage then passes into an air cooler 2, through which condensate from a steam turbine circuit flows, and is recooled to the starting temperature and state c, giving up a quantity of heat $Q_4$ corresponding to the area b, b', c', c to the condensate. In a compressor 3, the combustion air is compressed, being heated up to d, and passes into an air heater 4, traversed by steam bled from the steam turbine circuit, in which a heat quantity $Q_3$ corresponding to the area e, e', d', d is supplied to the combustion air, while the bled steam condenses and heats the combustion air up to the saturated steam temperature of the steam at e.

The quantity of heat $Q_3$ corresponds to a heating up of the compressed air from a temperature at d to a temperature at e, and the heat consequently no longer needs to be supplied in the combustion chamber of the gas turbine by the combustion of gas; indeed, it is previously consumed by combustion in a steam generator 9, causing a shift of the fuel requirement in the sense of a reduction of gas consumption in the gas turbine and an increase of coal consumption in a furnace 23 of the steam generator or steam power plant 9.

The compressed and preheated combustion air flows through a further air heater 5, where it receives a heat quantity $Q_2$ corresponding to the area f, f', e', e, so that the combustion air leaves the air heater 5 with a temperature at f.

The quantity of heat $Q_2$, which is removed from the steam generator 9 for heating up the compressed air from e to f, can no longer be transferred by bled steam, since the temperature of the latter is too low. Instead, a heat transfer medium is used which permits very much higher temperatures. Sodium, since its boiling temperature at ambient pressure is approximately 890° C. and furthermore increases sharply with a slight pressure increase, can supply heat without phase change up to very high temperatures to the air compressed for the gas turbine operation and correspondingly increase its temperature. The material properties of the sodium permit the heat from the heat exchanger to be transported to the gas turbine circuit and the costs and losses in the heat transfer to be kept small. From the air heater 5, the combustion air passes via an air line 31 into a combustion chamber 7.

The fuel gas of the gas turbine 8 is compressed in parallel with the combustion air, likewise in two stages by means of compressors 25, 27 and a gas cooler 26 is connected between them and is also cooled with condensate.

Condensate pumps 18 conduct the condensate from a condenser 17 to the air cooler 2 and the gas cooler 26 and thence to a feedwater preheater 14.

After the second compressor stage, the fuel gas passes via a gas heater 28 traversed by condensing bled steam and a gas heater 6 traversed by liquid sodium, into a fuel gas line 30 which also leads to the combustion chamber 7. The steam for the air heater 4 and the fuel gas heater 28 is obtained from the first stage of a two-stage steam turbine 11 and is conducted via a line 24 to the air heater 4 and the fuel gas heater 28. If necessary, the bled steam preheating of the air and the fuel gas may also be carried out in a multi-stage manner. The condensate is supplied from the air heater 4 and fuel gas heater 28 by means of a condensate pump 43 via a line 42 into a feedwater line upstream of a feed pump 20.

In the combustion chamber 7, from the combustion of the fuel gas with the compressed and preheated combustion air, a quantity of heat $Q_1$ corresponding to the area g, g', f', f is obtained. The temperature of the combustion gases rises to g. The combustion gases then pass through an exhaust gas line 32 to the gas turbine 8, in which they expand and cool down to a point h, performing work. The gas turbine 8 drives an electrical generator 15.

If necessary, only a portion of the combustion gas from the gas turbine 8 passes into the furnace chamber 23 of the steam generator 9 via a gas line 33, while a further portion of the combustion gas passes via an exhaust gas line 34, a sodium heater 35 and an exhaust gas line 36 into a chimney 29. In the furnace chamber 23, coal introduced via coal dust feed lines 44 is burnt.

Corresponding to the high temperatures at the point f already achieved by heating up of the air and fuel gas before combustion in the combustion chamber 7, the combustion in the combustion chamber 7 must be carried out with a high air excess, in order that the permissible gas turbine inlet temperature shall not be exceeded. This air excess is accompanied by an oxygen excess in the exhaust gases from the gas turbine 8, which enter the furnace chamber 23 of the steam generator 9 to provide combustion oxygen at a temperature corresponding to the point h.

The oxygen excess in the combustion gases from the gas turbine 8 therefore increases, with an unchanged gas turbine inlet temperature, the more the compressed air and fuel gas are preheated. A higher oxygen content, however, favours combustion of the coal in the steam generator 9, enables more coal to be burnt and allows a larger quantity of less high quality coal, in certain circumstances rather unsuitable for gasification, to be used.

A quantity of heat $Q_5$ corresponding to the area h, h', a', a is consequently supplied to the furnace chamber 23 of the steam generator 9 with the combustion oxygen from the gas turbine 8 and a quantity of heat $Q_6$ with the coal via the coal dust feed lines 44. Of these quantities of heat only a portion, namely the heat quantity $Q_2$, is supplied via a flue gas heat exchanger 10 to the sodium circuit 19 and thus to the air heater 5, and a heat quantity $Q'_2$ is supplied via the heat exchanger 10 and the sodium circuit 19 to the fuel gas heater 6. The flue gas heat exchanger or sodium heater 10, which is made of high-quality material, is preferably located at a favourable position, for example as a contact heating surface in the furnace chamber 23 of the steam generator 9, while the walls of the furnace chamber 23 are water-cooled as in conventional steam generators. In this way, heat transfer and firing problems and pressure losses, which arise in the construction of a gas turbine plant burning coal with air as the working medium, can be avoided.

The sodium circuit 19 thus absorbs, in the flue gas stream of the steam generator 9, the quantity of heat $Q_2$ and $Q'_2$, transfers it to the compressed combustion air and the fuel gas and heats both of these to a very high temperature. These quantities of heat $Q_2$ and $Q'_2$, which perform work in the gas turbine cycle, are released in a conventional coal-fired furnace 23, and therefore do not need to be supplied to the gas turbine cycle by the combustion of high-quality fuel gas. Likewise, the quantity of heat $Q_3$, which is supplied via the steam-heated air heater 4, and in an analogous manner the quantity of heat $Q'_3$, which is supplied to the fuel gas heater 28, are released in the coal-fired furnace 23 of the steam generator 9. They therefore also do not need to be supplied to the gas turbine cycle by the combustion of fuel gas. Thus, only the quantity of heat $Q_1$ corresponding to the area g, g', f', f needs to be provided by the combustion of fuel gas in the combustion chamber 7 of the gas turbine 8, so that either only a small quantity of expensive natural gas needs to be used or, if the fuel gas is obtained by gasification of coal, a considerably smaller, and thus less expensive, coal gasification plant will be needed than would have been necessary without the preheating of the compressed combustion air and of the fuel gas by means of the sodium heat transfer liquid and the bled steam from the steam power plant operation.

If the oxygen content in the furnace 23 is to be increased without a thermodynamic loss occurring, then air is supplied by a fresh air blower 37 through a fresh air preheater 38 and a line 39 into the furnace chamber 23 of the steam generator 9. The fresh air preheater 38 is also located in the sodium circuit and is thus heated by the sodium heater 10 disposed in the steam generator 9, so that the fresh air can be adjusted to the temperature most favourable for combustion.

The quantity of exhaust gas from the gas turbine 8 entering the furnace chamber 23 of the steam generator 9 can be reduced and instead partially replaced by air, by means of a further sodium heater in the form of an exhaust gas heat exchanger 35 connected in the exhaust gas line 34. Through the exhaust gas line 34, a portion of the exhaust gases from the gas turbine is conducted and gives up its heat to the sodium circuit. Through the exhaust gas line 36, this portion of the turbine exhaust gas is fed to the chimney 29. In order to achieve a low final temperature for this exhaust gas partial stream, the sodium heater 35 can be connected downstream of the fresh air preheater 38 with a circulating pump 40 between them, so that it is incorporated into the sodium circuit at a point of low temperature. A further circulating pump 41 supplies the sodium from the air heaters 5, 38 and from the fuel gas heater 6 to the sodium heater 10.

If the combined gas turbine-steam turbine operation is so constructed that the gas turbine inlet temperature does not exceed the outlet temperature at the air heater 5, then the combustion chamber 7, the fuel gas heater 6, the fresh air preheater 38 and the sodium heater 35 together with the associated piping may be dispensed with, since the combusted gas turbine cycle is simplified to a hot air turbine cycle. The entire quantity of exhaust air from the gas turbine 8 is then used as combustion air in the steam generator 9. Heat is then released only in the furnace chamber 23 of the steam generator 9, for example from coal, the heat required for the hot air turbine operation being entirely transferred by the sodium circuit 19.

In the steam generator 9, an evaporator 22 and a steam superheater 21 are provided. From here, the steam flows into the two-stage steam turbine 11, from the high-pressure part of which a portion of the steam is bled via a steam bleed point and is supplied via a line 24 to the heater 4 and the fuel gas heater 28. The main portion of the steam issuing from the high-pressure stage of the steam turbine 11 passes via an intermediate superheater (reheater) 13 into a medium-pressure and low-pressure stage and thence into a condenser 17. The steam turbine 11 drives an electrical generator 16 and has further steam bleed lines 12, which serve for feedwater preheating in regenerative preheating indicated by the feedwater preheater 14.

Condensate pumps 18 conduct the condensate from the condenser 17 to the air heater 4, the fuel gas heater 28, the air cooler 2, the fuel gas cooler 26 and the feedwater preheater 14, whence it is delivered, highly heated, by means of a feedwater pump 20 back into the steam generator 9. The condensate from the air heater 4 and from the fuel gas heater 28 is supplied via the line 42 and the pump 43, on account of its higher temperature, to the steam circuit at a suitable point upstream of the feed pump 20.

With the method and the apparatus in accordance with this invention, there is a considerable increase in fuel conversion efficiency compared with previous techniques. In combined gas turbine and steam turbine operations using the gas and coal as fuels, an increase in the coal proportion can be achieved with the method of the invention. Furthermore, a combined gas turbine and steam turbine operation using coal exclusively can be obtained, the greater part of the coal required being burnt in a conventional furnace, while only a smaller part needs to be gasified in a coal gasification plant. From this a substantial reduction and/or simplification in the coal gasification plant results. The smaller size of plant, the shift of the fuel required towards the more economical and easily available coal as compared with natural gas, and the higher thermal efficiency permit a more economical cycle management in electrical power plants to be carried out and this is also environmentally more favourable on account of the smaller specific quantity of fuel used.

I claim:

1. In a method of driving an electrical power plant by the combined operation of a gas turbine and a steam turbine spaced from said gas turbine, a steam power plant including a furnace for supplying steam to said steam turbine, comprising the steps of heating combustion air and feeding the heated combustion air to said gas turbine, compressing the air fed to said gas turbine, heating the compressed air in a multi-stage manner initially by steam from said steam power plant and then by a heated liquid heat carrier, where the heated liquid heat carrier is at low pressure in the range of atmosphere to 2.7 bar with the heat carrier remaining liquid to temperatures up to 1,000° C., and heating the liquid heat carrier in said steam power plant.

2. In a method of driving an electrical power plant by the combined operation of a gas turbine and a steam turbine spaced from said gas turbine, a steam power plant including a furnace for supplying steam to said steam turbine, comprising the steps of heating combustion air and feeding the heated combustion air to said gas turbine, compressing fuel gas and feeding the fuel gas to said gas turbine, heating the compressed fuel gas in a multi-stage manner initially by steam from said steam power plant and then by a heated liquid heat carrier, with the heated liquid heat carrier being at low pressure in the range of atmosphere to 2.7 bar and remaining liquid to temperatures up to 1,000° C., and heating the liquid heat carrier in said steam power plant.

3. A method as claimed in one of claims 1 and 2 comprising the step of feeding at least part of the exhaust gas from said gas turbine to the furnace of the steam power plant which includes said steam turbine.

4. A method as claimed in one of claims 1 and 2 in which said liquid heat carrier is selected from the group consisting of sodium, potassium, an eutectic alloy of potassium and sodium, mercury and suitable salts.

5. A method as claimed in claim 2 further comprising the steps of compressing said fuel gas for said gas turbine in a multi-stage manner and recooling said fuel gas between two stages of compression by means of condensate from said steam turbine of said steam power plant.

6. A method as claimed in claim 1, further comprising the steps of compressing said air for said turbine in a multi-stage manner and recooling said air between two stages of compression by means of condensate from said steam turbine of said steam power plant.

* * * * *

UNITED STATES PATENT AND TRADEMARK OFFICE
CERTIFICATE OF CORRECTION

PATENT NO. : 4,720,968
DATED : January 26, 1988
INVENTOR(S) : E.H. Klaus Knizia

It is certified that error appears in the above-identified patent and that said Letters Patent is hereby corrected as shown below:

On the Title Page
In the heading of the patent, it should read:

-- [56]   References Cited
    U.S. PATENT DOCUMENTS

| | | | |
|---|---|---|---|
| 2,653,447 | 9/1953 | Heller | 60/39.182 |
| 2,787,121 | 4/1957 | Bouffart | 60/39.465 |
| 3,164,958 | 1/1965 | Paucault | 60/39.182 |
| 3,335,565 | 8/1967 | Aguet | 60/39.182 |
| 3,735,588 | 5/1973 | Moskowitz et al | 60/39.511 |

Signed and Sealed this

Twenty-third Day of August, 1988

*Attest:*

DONALD J. QUIGG

*Attesting Officer*  *Commissioner of Patents and Trademarks*